United States Patent
Di-Gianni et al.

(10) Patent No.: US 10,505,349 B2
(45) Date of Patent: Dec. 10, 2019

(54) DEVICE FOR THE GENERATION, TRANSMISSION, DISTRIBUTION AND/OR USE OF ELECTRICAL ENERGY OR COMPONENT OF SUCH A DEVICE AND GAS SEAL FOR SUCH A DEVICE OR COMPONENT

(71) Applicant: ABB Schweiz AG, Baden (CH)

(72) Inventors: Anna Di-Gianni, Dättwil (CH); Denis Tehlar, Zürich (CH); Patrick Meier, Staufen (CH); Pia Aschwanden, Goldau (CH); Rico Gasparini, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/041,157

(22) Filed: Jul. 20, 2018

(65) Prior Publication Data

US 2019/0067918 A1 Feb. 28, 2019

Related U.S. Application Data

(63) Continuation of application No. PCT/EP2017/051163, filed on Jan. 20, 2017.

(30) Foreign Application Priority Data

Jan. 21, 2016 (DE) .................. 20 2016 100 268 U

(51) Int. Cl.
*H02B 13/045* (2006.01)
*H01B 3/28* (2006.01)
(Continued)

(52) U.S. Cl.
CPC ......... *H02B 13/045* (2013.01); *C08F 210/12* (2013.01); *C09K 3/10* (2013.01);
(Continued)

(58) Field of Classification Search
CPC ..... H01F 27/321; H01F 27/14; H02B 13/045; C09K 3/10; C08F 210/12; H02K 3/30;
(Continued)

(56) References Cited

U.S. PATENT DOCUMENTS 6,594,133 B1 * 7/2003 Schmidt .................. H01C 7/12
361/117
6,633,009 B1 * 10/2003 Shea ..................... H01H 3/3031
200/61.08

(Continued)

FOREIGN PATENT DOCUMENTS

CN 102047365 A 5/2011
CN 102460604 A 5/2012
(Continued)

OTHER PUBLICATIONS

German Patent Office, Search Report (including translation) issued in corresponding Application No. 20 2016 100 268.0, dated Aug. 12, 2016, 17 pgs. (including translation).
(Continued)

*Primary Examiner* — Adam B Dravininkas
(74) *Attorney, Agent, or Firm* — Taft Stettinius & Hollister LLP; J. Bruce Schelkopf

(57) ABSTRACT

A device or component thereof is provided for generation, transmission, distribution and/or use of electrical energy. In at least one insulation space formed within the device, there is a current-conducting component. The insulation space includes a dielectric insulation medium that surrounds the current-conducting component. This insulation medium includes a) at least one organofluorine compound selected from the group consisting of fluoroketones, fluoronitriles, and mixtures thereof and b) a carrier gas comprising at least one component selected from the group consisting of air, an air component, $CO_2$, or a mixture of these components. The device includes at least one gas seal for sealing of the at least
(Continued)

one insulation space from a further space. The gas seal includes butyl rubber as seal material.

20 Claims, 1 Drawing Sheet

(51) Int. Cl.
| | | |
|---|---|---|
| H01H 33/56 | (2006.01) | |
| H02K 3/30 | (2006.01) | |
| C08F 210/12 | (2006.01) | |
| H01B 3/24 | (2006.01) | |
| H01B 3/56 | (2006.01) | |
| C09K 3/10 | (2006.01) | |
| H01F 27/32 | (2006.01) | |
| H02G 5/06 | (2006.01) | |

(52) U.S. Cl.
CPC ............... *H01B 3/24* (2013.01); *H01B 3/28* (2013.01); *H01B 3/56* (2013.01); *H01F 27/321* (2013.01); *H01H 33/56* (2013.01); *H02K 3/30* (2013.01); *H01H 33/565* (2013.01); *H02G 5/063* (2013.01)

(58) Field of Classification Search
CPC ...... H01H 33/56; H01H 33/565; H02G 5/063; H01B 3/56; H01B 3/24; H01B 3/28
See application file for complete search history.

(56) References Cited

U.S. PATENT DOCUMENTS

| | | | |
|---|---|---|---|
| 7,170,004 B2* | 1/2007 | Gramespacher | H02G 15/068 174/73.1 |
| 7,312,412 B2* | 12/2007 | Cravey | H01T 2/00 200/81 R |
| 8,492,672 B2 | 7/2013 | Shea | |
| 2002/0063111 A1* | 5/2002 | Nishitani | H02B 13/045 218/118 |
| 2007/0221626 A1* | 9/2007 | Uchii | H01H 33/56 218/57 |
| 2013/0033796 A1* | 2/2013 | Shea | H01H 39/004 361/126 |
| 2016/0241004 A1* | 8/2016 | Kieffel | H01B 3/56 |
| 2016/0307716 A1* | 10/2016 | Florez | H01H 33/22 |

FOREIGN PATENT DOCUMENTS

| | | |
|---|---|---|
| CN | 103415895 A | 11/2013 |
| CN | 103597565 A | 2/2014 |
| CN | 103956673 A | 7/2014 |
| CN | 103956674 A | 7/2014 |
| EP | 2284854 A1 | 2/2011 |
| EP | 2652752 B1 | 9/2015 |
| JP | 2003169411 A | 6/2003 |
| JP | 2005269684 A | 9/2005 |
| WO | 2008073790 A2 | 6/2008 |
| WO | 2010142346 A1 | 12/2010 |
| WO | 2012080246 A1 | 6/2012 |
| WO | 2015/052100 A1 | 4/2015 |
| WO | 2015/071303 A1 | 5/2015 |

OTHER PUBLICATIONS

German Patent Office, Written Opinion of the International Searching Authority; International Application No. PCT/EP2017/051163; dated Jul. 5, 2017; 11 pgs. (including translation).

First Office Action issued in corresponding Chinese application No. 201780019223.4, dated Jun. 6, 2019, 16 pp.

\* cited by examiner

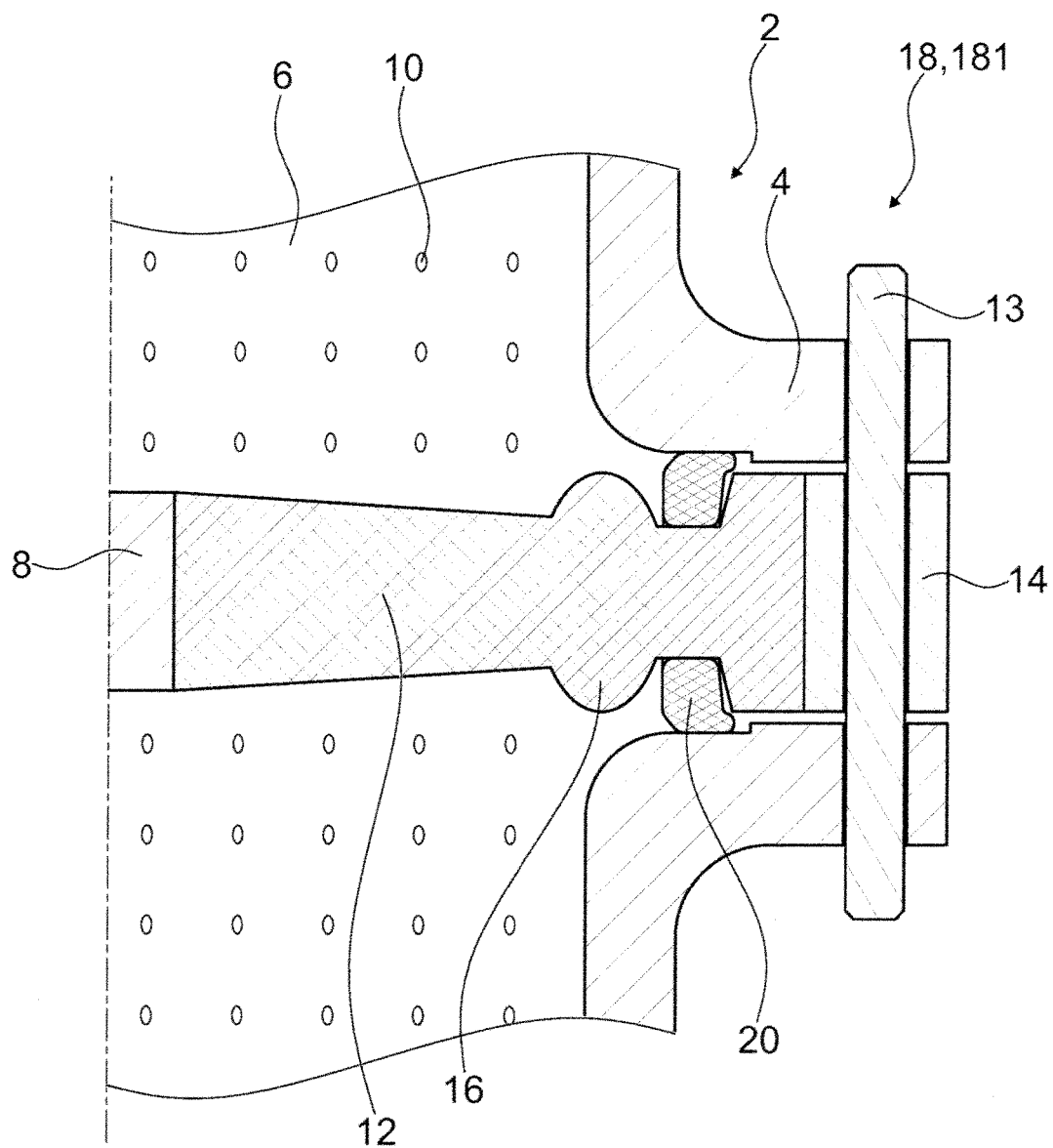

DEVICE FOR THE GENERATION, TRANSMISSION, DISTRIBUTION AND/OR USE OF ELECTRICAL ENERGY OR COMPONENT OF SUCH A DEVICE AND GAS SEAL FOR SUCH A DEVICE OR COMPONENT

The present invention relates to a device for generation, transmission, distribution and/or use of electrical energy or a component thereof, and to a gas seal for such a device or component.

In devices of the type mentioned at the outset, liquid or gaseous dielectric insulation media are frequently used for the dielectric insulation of the current-conducting component. Insulation media of this kind are used as standard, inter alia, in gas-insulated switchgear (GIS), gas-insulated pipelines (GIL) or transformers. For example, in metal-encapsulated GIS, the current-conducting component is disposed in a housing that bounds an insulation space in which an insulation gas is present in order to insulate the housing from the current-conducting components and in this way to prevent electrical flashover.

For power interruption in high-voltage switchgear, the insulation gas additionally assumes the function of an arc quench gas.

U.S. Pat. No. 8,492,672 discloses an arrestor for arc quenching by means of a movable electrode. In the armed state, an insulation space between the fixed and movable electrode is filled with an insulation liquid or with an insulation gas composed of $SF_6$, compressed air, $N_2$, perfluorocarbon or chlorofluorocarbon compounds and optionally insulated with a large-area, membrane-like solid insulation, for example made of butyl rubber. The membrane-like solid insulation is designed such that it can be penetrated by the movable electrode on activation of the arrestor.

EP 2 284 854 discloses a gas-insulated switchgear unit which is operated with arc quench gas composed of $SF_6$, air, $N_2$, $CO_2$, $O_2$, $H_2$, or perfluorocarbon or hydrofluorocarbon compounds. Problems with gastightness in the case of use of $H_2$ or $CO_2$ are solved by choosing a greater construction volume with more gas storage in the case of a somewhat longer gas seal or gas seals of twice the thickness, or by replacing $H_2$ with $CH_4$, which is less likely to diffuse. Seal materials proposed are nitrile rubber, fluoro rubber, silicone rubber, acrylic rubber, ethylene-propylene rubber, ethylene-propylene-diene rubber (EPDM), butyl rubber, urethane rubber, Hypalon or ethylene-vinyl acetate resin.

WO 2008/073790 discloses insulation gases for gas-insulated switchgear having boiling points below −20° C., including various fluoro ethers, a fluoromonoketone having 3 carbon atoms, a fluorodiketone having 4 carbon atoms, various fluoroolefins, and specific fluoronitriles having 1 or 2 or 3 carbon atoms.

A frequently used insulation gas or arc quench gas is sulfur hexafluoride ($SF_6$), which not only has extremely good dielectric properties but, moreover, is also virtually chemically inert and nonflammable.

However, in the recent past, organofluorine compounds have been proposed as interesting alternatives to $SF_6$. These organofluorine compounds have extremely low global warming potential (GWP) and an ozone depletion potential (ODP) of 0.

For instance, WO 2010/142346 discloses a dielectric insulation medium comprising a fluoroketone having 4 to 12 carbon atoms. WO 2012/080246 further discloses a fluoroketone having exactly 5 carbon atoms (hereinafter: "C5K"), present in a mixture with an insulation gas component other than C5K.

It has been found that fluoroketones have exceptionally good insulation properties. More particularly, they have high dielectric strength and are additionally suitable for the quenching of arcs. At the same time, they have a very low toxicity. Moreover, particularly advantageous mixtures have been found to be those in which the fluoroketone is present together with $O_2$, $N_2$ and/or $CO_2$ as carrier gas (or "background gas"). However, the fluoroketones that are possible alternatives to $SF_6$ have a relatively high boiling point. The partial pressure of the fluoroketones under operating conditions of the device is thus relatively low.

In order to obtain sufficiently good dielectric insulation, therefore, a relatively high gas density of the fluoroketone-containing gas mixtures is chosen. This in turn means that the housing that bounds the insulation space has to be able to withstand a relatively high pressure, or that escape of the insulation gas in the insulation space can be effectively prevented even in the case of relatively high pressure.

In order to prevent escape of the insulation gas, gas seals are typically used, for example sealing rings. These are intended to achieve sealing of the insulation space, especially at interfaces, from another space, especially from the environment of the device. If it were not possible to assure such sealing, the maintenance intervals for the device, and more particularly for the re-establishment of the desired insulation gas composition, would have to be shortened, meaning that the device would have to be shut down at an early stage in order to replace at least some of the insulation gas, which is obviously disadvantageous.

A useful material for a gas seal is in principle EPDM, for instance, which is described as the seal material of choice in connection with $SF_6$ in high-voltage systems. However, it has been found that elastomers generally have relatively high gas to permeability. More particularly, EPDM seals, in spite of the otherwise excellent properties at the high pressure mentioned, have relatively high permeability with respect to individual carrier gas components, especially $O_2$, $CO_2$ and $N_2$.

In addition, it has been found that organofluorine compounds, in spite of their inertness, can react to a certain degree with individual solid components of the device and be degraded, which firstly directly affects the functionality of the insulation gas. Secondly, the solid component mentioned can also be damaged by the interaction with the organofluorine compound, which is of relevance especially when the solid component is a gas seal and it has an elevated leakage rate in the damaged state. Owing to the material incompatibility mentioned, it is thus possible for the functionality of the insulation gas to be impaired indirectly as well, namely as a result of elevated outflow of the carrier gas through the damaged gas seal.

It is thus an object of the present invention to provide a device of the type mentioned at the outset which uses an alternative insulation medium, and in which the insulation medium is fully functioning over a long period and which thus has to be maintained only relatively infrequently.

More particularly, even at a high pressure in the insulation space of the device, maximum gas sealing of the insulation space is to be assured.

Specifically, the gas seals present in the device are to have high material compatibility with the organofluorine compound and simultaneously show low permeability with respect to the carrier gas present in a mixture with the organofluorine compound, especially with respect to $O_2$, $CO_2$ and/or $N_2$. Moreover, the gas seal is also to have low permeability with respect to water, in order to avoid penetration thereof into the insulation space, where it can accelerate the breakdown of the insulation gas or individual components thereof.

The object of the invention is achieved by the subject matter of claim 1. Preferred embodiments are stated in the dependent claims.

According to claim 1, in at least one insulation space formed within the device for generation, transmission, distribution and/or use of electrical energy, there is disposed an electrically conductive component which comprises a dielectric insulation medium that surrounds the electrically conductive component. This insulation medium comprises a) at least one organofluorine compound selected from the group consisting of fluoroketones, fluoronitriles, and mixtures thereof and b) a carrier gas comprising at least one component selected from the group consisting of air, an air component, $CO_2$, or a mixture of these components.

This insulation medium has high dielectric strength. Owing to its excellent arc quenching properties, the insulation medium is specifically suitable for switchgear as well.

At the same time, the insulation medium has an extremely low global warming potential, an ozone depletion potential of 0 and very low toxicity.

For sealing of the at least one insulation space from a further space, the device comprises, in accordance with the invention, at least one gas seal which comprises butyl rubber as seal material. The term "gas seal" thus also encompasses gas seals which comprise further material as well as butyl rubber, and also gas seals consisting essentially or entirely of butyl rubber.

The "further space" in the context of the present invention is generally the environment of the device. However, it is conceivable that the further space relates to a space or compartment of the device from which the insulation space should be at least near-hermetically sealed.

In general, the medium present in the further space differs from the insulation medium in the insulation space. In the case that the further space is the environment of the device, this medium is air. But it is also conceivable that the medium in turn is a further insulation medium, especially an insulation medium with elevated dielectric properties compared to air.

It has been found that, by virtue of the inventive selection of butyl rubber as seal material, gas seals having very high material compatibility with respect to organofluorine compound are obtained. There is high material compatibility between insulation medium and seal material especially in the case of use of 1,1,1,3,4,4,4-heptafluoro-3-(trifluoromethyl)butan-2-one, which is referred to here as "C5 ketone" for short. As set out further down, C5 ketone, owing to its dielectric properties that arise in combination with a carrier gas and its high environmental compatibility, is used with particular preference as organofluorine compound. The butyl rubber gas seal likewise has high material compatibility with insulation gases containing fluoronitrile, especially perfluorobutyronitrile ($C_3F_7CN$) and preferably perfluoroisobutyronitrile of the formula $(CF_3)_2CFCN$ and/or perfluoro-2-methoxypropanenitrile of the formula $CF_3CF(OCF_3)CN$.

The high material compatibility not only has the advantage that the reactive degradation of organofluorine compounds can be reduced or eliminated. The gas seal also has elevated long-term stability as a result of the improved material compatibility, i.e. even when it is exposed to organofluorine compounds over a prolonged period, the function is not impaired and is maintained.

Moreover, it can be ensured by virtue of the inventive selection of butyl rubber that permeability with respect to the carrier gas or a carrier gas component, i.e. more particularly with respect to $CO_2$, $O_2$, $N_2$ and/or air, is very low. More particularly, permeability is significantly lower than, for instance, in the case of use of EPDM as seal material.

Ultimately, it is thus possible in accordance with the invention to obtain a device of the generic type with an insulation medium based on an organofluorine compound, in which good gas sealing of the space containing the insulation medium is assured, even at a relatively high pressure. Since the seal material used for the gas sealing has not only low permeability with respect to the carrier gas or individual carrier gas components present in the insulation medium, but simultaneously also has good material compatibility with the organofluorine compound, replacement of the insulation medium and/or the gas seal is necessary only relatively infrequently, which makes an overall contribution to low-maintenance operation of the device. With regard to the low permeability with respect to water, it is thus possible to avoid penetration of water into the insulation space and involvement thereof in any potential breakdown of the insulation gas or components thereof, especially the organofluorine compound.

Specifically, it has been shown that the intervals for the refilling of the device with insulation medium can be prolonged in accordance with the invention by a factor of about 3. Since the butyl rubber seal material used in accordance with the invention has good availability and is relatively inexpensive, no material-related extra costs arise in respect thereof.

As mentioned, the insulation space contains a dielectric insulation medium comprising at least one organofluorine compound selected from the group consisting of fluoroketones, especially perfluoroketones, fluoronitriles, especially perfluoronitriles, and mixtures thereof.

The invention encompasses embodiments in which the insulation medium comprises either a single compound from the group consisting of fluoroketones, especially perfluoroketones, fluoronitriles, especially perfluoronitriles, or else a mixture of at least two compounds from this group.

The insulation medium may be a fluoroketone, especially a fluoroketone having 4 to 12 carbon atoms.

The term "fluoroketone" as used in the context of this invention should be interpreted broadly and especially encompasses both perfluoroketones and hydrofluoroketones, and further encompasses saturated compounds and unsaturated compounds, i.e. compounds having double and/or triple bonds between carbon atoms. The at least partly fluorinated alkyl chains of the fluoroketones may be linear or branched or may form a ring optionally substituted by one or more alkyl groups. In illustrative embodiments, the fluoroketone is a perfluoro-ketone, wherein there may be a branched alkyl chain which may especially be an at least partly fluorinated alkyl chain and which is preferably fully fluorinated.

In a particularly preferred embodiment, the fluoroketone has 5 or 6 carbon atoms. Such fluoroketones are thermally stable up to 500° C.

Fluoroketones having exactly 5 carbon atoms are referred to here as fluoroketones a) for short.

In particular, the fluoroketone is at least one compound selected from the group consisting of the compounds defined by the following following structural formulae in which at least one hydrogen atm has been replaced by a fluorine atom:

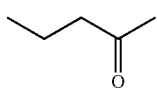 (Ia)

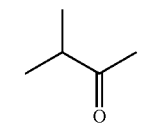 (Ib)

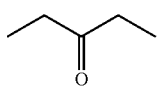 (Ic)

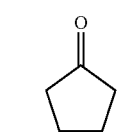 (Id)

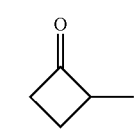 (Ie)

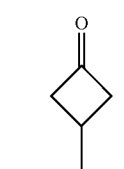 (If)

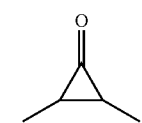 (Ig)

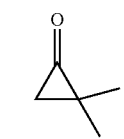 (Ih)

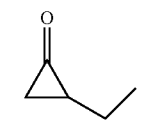 (Ii)

Fluoroketones, especially fluoroketones a), having a branched alkyl chain are generally preferred because their boiling points are lower than the boiling points of the corresponding compounds (i.e. with the same empirical formula) having a linear alkyl chain.

In a particular embodiment, the fluoroketone a) is a perfluoroketone, specifically with the empirical formula $C_5F_{10}O$, i.e. fully saturated, and so without double or triple bonds between carbon atoms. More preferably, the fluoroketone is selected from the group consisting of 1,1,1,3,4,4,4-heptafluoro-3-(trifluoromethyl)butan-2-one (also referred to as decafluoro-2-methylbutan-3-one), 1,1,1,3,3,4,4,5,5,5-decafluoropentan-2-one, 1,1,1,2,2,4,4,5,5,5-decafluoropentan-3-one and octafluorocyclo-pentanone, and is most preferably 1,1,1,3,4,4,4-heptafluoro-3-(trifluoromethyl)butan-2-one.

1,1,1,3,4,4,4-Heptafluoro-3-(trifluoromethyl)butan-2-one can be represented by the following structural formula (I):

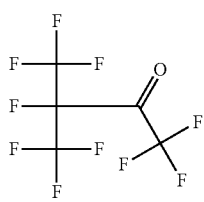 (I)

1,1,1,3,4,4,4-Heptafluoro-3-(trifluoromethyl)butan-2-one, which is referred to here as "C5 ketone" for short and which has the molecular formula $CF_3C(O)CF(CF_3)_2$ or $C_5F_{10}O$, is particularly preferred for a use in high- and moderate-voltage insulation applications because it combines the advantages of high dielectric strength, especially in a mixture with a dielectric background or carrier gas, a very low GWP value and a low boiling point. It further has an ODP (ozone depletion potential) value of 0 and is virtually nontoxic.

It is additionally conceivable that a fluoroketone having exactly 5 carbon atoms according to the above remarks, which is referred to here as fluoroketone a) for short, and a fluoroketone having exactly 6 carbon atoms or exactly 7 carbon atoms, which is referred to here as fluoroketone c) for short, are simultaneously present in the dielectric insulation medium. The result is thus an insulation medium comprising more than one fluoroketone, where each fluoroketone in itself contributes to the dielectric strength of the insulation medium.

In a particular embodiment, the further fluoroketone c) is at least one compound selected from the group consisting of the compounds defined by the following structural formulae in which at least one hydrogen atom has been replaced by a fluorine atom:

 (IIa)

 (IIb)

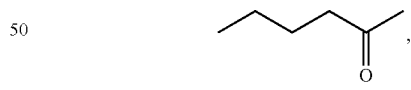 (IIc)

 (IId)

 (IIe)

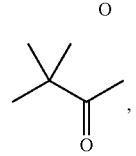 (IIf)

(IIg) 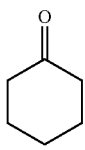

and all fluoroketones having exactly 6 carbon atoms in which the at least partly fluorinated alkyl chain of the fluoroketone forms a ring substituted by one or more alkyl chains (IIh);

and/or at least one compound selected from the group consisting of the compounds defined by the following structural formulae in which at least one hydrogen atom has been replaced by a fluorine atom:

(IIIa) 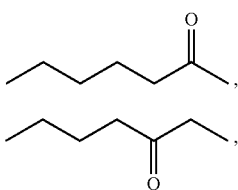

(IIIb) 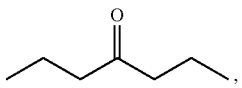

(IIIc) 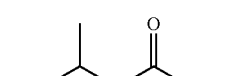

(IIId) 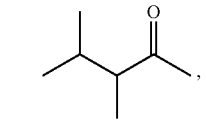

(IIIe) 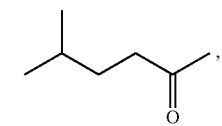

(IIIf) 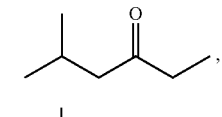

(IIIg) 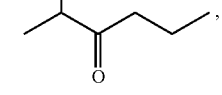

(IIIh) 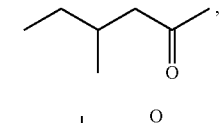

(IIIi) 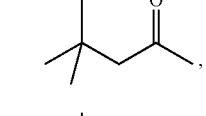

(IIIj) 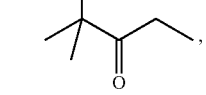

(IIIk) 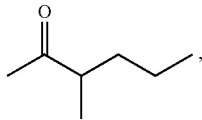

(IIIl) 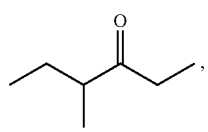

(IIIm) 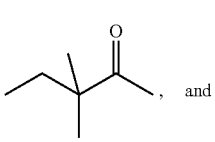, and (IIIn) 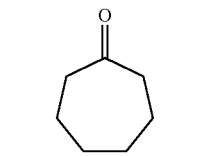

named as dodecafluorocycloheptanone, and all fluoroketones having exactly 7 carbon atoms in which the at least partly fluorinated alkyl chain of the fluoroketone forms a ring substituted by one or more alkyl chains (IIIo).

The present invention encompasses all compounds and any combination of compounds selected from the group consisting of the compounds of the structural formulae (Ia) to (Ii), (IIa) to (IIh), (IIIa) to (IIIo) and mixtures thereof.

In a particular embodiment, fluoroketone c), like fluoroketone a), is a perfluoroketone and/or has a branched alkyl chain, especially an at least partly fluorinated alkyl chain, and/or is a fully saturated compound.

More particularly, the fluoroketone c) has the empirical formula $C_6F_{12}O$, i.e. is a fully saturated compound, and so is a compound without double or triple bonds between carbon atoms.

Preferably, the fluoroketone c) is selected from the group consisting of 1,1,1,2,4,4,5,5,5-nonafluoro-2-(trifluoromethyl)pentan-3-one (also referred to as dodecafluoro-2-methylpentan-3-one), 1,1,1,3,3,4,5,5,5-nonafluoro-4-(trifluoromethyl)pentan-2-one (also referred to as dodecafluoro-4-methylpentan-2-one), 1,1,1,3,4,4,5,5,5-nonafluoro-3-(trifluoromethyl)pentan-2-one (also referred to as dodecafluoro-3-methylpentan-2-one), 1,1,1,4,4,4-hexafluoro-3,3-bis(trifluoromethyl)butan-2-one (also referred to as dodecafluoro-3,3-(dimethyl)butan-2-one), dodecafluorohexan-2-one, dodecafluorohexan-3-one and decafluorocyclohexanone, and is especially the 1,1,1,2,4,4,5,5,5-nonafluoro-2-(trifluoromethyl)pentan-3-one mentioned.

1,1,1,2,4,4,5,5,5-Nonafluoro-2-(trifluoromethyl)pentan-3-one (also referred to as dodecafluoro-2-methylpentan-3-one) can be represented by the following structural formula (II):

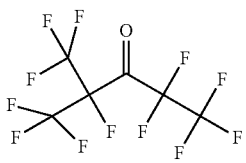

(II)

1,1,1,2,4,4,5,5,5-Nonafluoro-4-(trifluoromethyl)pentan-3-one (referred to here as "C6 ketone" for short with the molecular formula $C_2F_5C(O)CF(CF_3)_2$), particularly for high-voltage insulation applications, is particularly preferred owing to its good insulating properties and its extremely low GWP value.

As likewise mentioned above, the organofluorine compound used may also be a fluoronitrile, especially a perfluoronitrile.

Preferably, the fluoronitrile, especially the perfluoronitrile, has four carbon atoms.

In a further-preferred embodiment, the fluoronitrile may be a perfluoroalkylnitrile, especially perfluorobutyronitrile ($C_3F_7CN$).

More particularly, the fluoronitrile may be perfluoroisobutyronitrile (of the formula $(CF_3)_2CFCN$) and/or perfluoro-2-methoxypropanenitrile (of the formula $CF_3CF(OCF_3)CN$). Among these, perfluoroisobutyronitrile is particularly preferred owing to its low toxicity.

In general working examples, preference is given to those fluoroketones and/or fluoronitriles that have boiling points at atmospheric pressure of higher (i.e. warmer) than −5° C., and/or that have GWPs over 100 years of less than 2500, and/or have low toxicity.

As mentioned, the insulation medium comprises a carrier gas comprising at least one component selected from the group consisting of air, an air component, especially nitrogen ($N_2$) and/or oxygen ($O_2$), and carbon dioxide ($CO_2$), and mixtures thereof. More preferably, the insulation medium comprises carbon dioxide and optionally an air component, especially oxygen and/or nitrogen.

In a particular embodiment, the insulation medium is a gas mixture comprising carbon dioxide and oxygen. The ratio of the amount of carbon dioxide to the amount of oxygen here is preferably within a range from 50:50 to 100:1.

Especially with regard to interruption of power in a high-voltage switchgear unit, it is particularly preferable that the ratio of the amount of carbon dioxide to the amount of oxygen is within a range from 80:20 to 95:5, more preferably from 85:15 to 92:8, even more preferably from 87:13 to less than 90:10, and especially about 89:11.

As mentioned, the seal material used in accordance with the invention for the gas seal is butyl rubber. Butyl rubber is also known to the person skilled in the art by the IIR name (isobutene-isoprene rubber) and can especially be represented by means of the following structural formula:

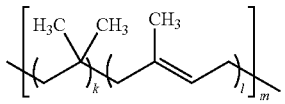

where k, l, m are integer indices. In connection with the present invention, the name "butyl rubber" encompasses both unmodified butyl rubber and modified butyl rubber, for instance chlorobutyl rubber (CIIR) or bromobutyl rubber (BIIR).

In a preferred embodiment, the butyl rubber, with regard to good vulcanizability, has an isoprene content in the range from 1 mol % to 3 mol %, preferably from 1.5 mol % to 2.5 mol %, and more preferably of about 2 mol %. Corresponding butyl rubbers are notable for a particularly low permeability with respect to the carrier gas, especially with respect to $CO_2$ and/or $O_2$ and/or $N_2$.

The term "butyl rubber" as used in connection with the present invention encompasses any kind of butyl rubbers, for example including those obtainable via vulcanization by means of a vulcanization system based on sulfur or a sulfur donor. More preferably, the butyl rubber is obtained via vulcanization by means of a vulcanization system based on a resin, since this can achieve elevated carbon-carbon crosslinking. The resin may especially be a phenolic resin, specifically a resin based on an alkylphenol-formaldehyde derivative.

With regard to the dimension and shape of the size of the gas seal, all those suitable for the industrial use are conceivable, especially the required seal sizes, seal thicknesses and seal gastightnesses.

In a particularly preferred execution, the gas seal is in the form of a closed ring having any cross section. For instance, O-rings in a shape in which they are typically used for indoor GIS or outdoor GIS are conceivable (GIS=gas-insulated switchgear).

As well as the circular cross section as exists in the case of the customarily used O-rings, other cross sections are also conceivable, for instance an X-shaped or rectangular cross section. Further working examples are, as well as the gas seals mentioned in conventional O-ring form, for instance, also gas seals in the form of a double O-ring.

For the production of the gas seals, any methods that the person skilled in the art considers to be suitable in the specific case are conceivable. More particularly, the gas seals may be produced by an injection molding method. Further working examples are endless O-rings or bonded O-rings.

The present invention encompasses embodiments in which all the present gas seals comprise or consist of butyl rubber as seal material, and embodiments in which this is the case only for some of the present gas seals. Especially encompassed are thus also parts having a butyl rubber coating, and parts ensheathed with butyl rubber and in-mold-coated with butyl rubber.

In the case that, as well as the at least one gas seal comprising butyl rubber, at least one further gas seal made of another material (e.g. EPDM) is present, it may be preferable to mark the gas seals. This can be accomplished, for instance, with the aid of a visible color dot or a specific tactile property. Specifically in the case of use of additional seal materials with properties optimized with respect to the insulation medium (for example improved or reduced permeability), the marking permits easy recognition of the gas seals to be replaced earlier. In other words, it is thus possible to avoid replacement of the gas seals according to the present invention that have improved properties (for example reduced permeability) at a time when they are still fully functioning.

In principle, the invention relates to any device for generation, transmission, distribution and/or use of electrical energy with at least one insulation space formed in the interior thereof.

In a preferred embodiment, the device or the component of this device is a switchgear unit, especially a gas-insulated, metal-encapsulated switchgear unit, a switch, especially a grounding switch, an isolating switch, a circuit breaker and/or a power switch, a high-voltage power switch optionally having a heating chamber for provision of a self-blast effect, a transformer, especially a distribution transformer or a power transformer, an electrical rotating machine, a generator, a motor, a drive, a semiconductive component and/or a power electronics device, and/or a converter station.

As well as the abovementioned device or component, the present invention additionally relates to a gas seal for the device or component. As mentioned, this gas seal contains butyl rubber as seal material. The term "gas seal" thus also encompasses gas seals which contain further material as well as butyl rubber, and also gas seals consisting essentially of butyl rubber.

The invention or the technical effect obtained therewith is further illustrated by the following experimental data:

In a first experimental arrangement, the permeability of butyl rubber with respect to various carrier gases ($CO_2$ or $N_2$) was determined at 20° C. The results are shown in table 1.

TABLE 1

| | Gas permeability rate ($cm^3/m^2*d*bar$) | | | |
|---|---|---|---|---|
| Material | EPDM (comparative example) | FKM (comparative example) | NBR (comparative example) | IIR (inventive) |
| $CO_2$; 20° C. | 1473 | 1470 | 1792 | 58.3 |
| $N_2$; 20° C. | 223 | negligible | negligible | 2.85 |

As apparent from the results, at 20° C., the gas permeability rate with respect to $CO_2$ for butyl rubber (IIR) is a factor of at least 25 lower than for the other plastics that were tested as comparative examples: EPDM (ethylene-propylene-diene rubber), FKM (fluoro rubber), and NBR (nitrile-butadiene rubber).

With regard to permeability with respect to $N_2$ as carrier gas as well, at 20° C., significantly lower gas permeability rates were determined for butyl rubber than for EPDM. Butyl rubber, which is inert with respect to the organofluorine compound of the insulation medium, thus shows only very low permeability and, more particularly, far lower permeability than EPDM with respect to the carrier gases of the insulation medium that were tested. More particularly, the permeability of butyl rubber is also greatly reduced compared to nitrile rubber which, according to the organofluorine compound used, exhibits inadequate material compatibility.

The invention is further illustrated by the present FIGURE. The FIGURE shows:

FIG. 1 purely in schematic form and in sectional view, part of a device of the invention with a gas seal for sealing of an insulation space of the device from the environment of the device.

The device 2 shown in FIG. 1 comprises an encapsulation 4 that surrounds an insulation space 6 in which there is disposed a current-conducting or voltage-conducting component 8 and which comprises a dielectric insulation medium 10 that surrounds the current-conducting or voltage-conducting component. The insulation medium 10 firstly comprises an organofluorine compound and secondly a carrier gas, nitrogen ($N_2$) in the specific case.

The current-conducting component 8 is held by means of an insulator 12 which is joined to the encapsulation 4 on its side remote from the current-conducting component 8 by means of a metal ring 14 secured by means of a clamping pin 13. In the specific embodiment shown, the insulator 12 has a circumferential bead 16 for mounting of a seal system.

To seal the insulation space 6 from the environment 181 of the device, which is defined as the "further space" 18 of the invention, a gas seal 20 is provided between the encapsulation 4 and the insulator 12, which is supposed to ensure that the insulation medium 10 can escape through any leak present between the encapsulation 4 and the insulator 12 or the metal ring 14, and that air can penetrate from the environment 181 into the insulation space 6.

According to the invention, the gas seal 20 comprises butyl rubber as seal material or the gas seal 20 consists of butyl rubber as seal material.

In working examples, the butyl rubber in the gas seal 20 has an isoprene content in the range from 1 mol % to 3 mol %, preferably from 1.5 mol % to 2.5 mol %, and more preferably of about 2 mol %.

In further working examples, only part of the gas seal (20) comprises or consists of butyl rubber. More particularly, the gas seal 20 may have a butyl rubber coating or have been ensheathed with butyl rubber or have been in-mold-coated with butyl rubber.

In further working examples, as well as the at least one gas seal 20 comprising butyl rubber, at least one further gas seal (not shown) made of another material, especially EPDM, is present. More particularly, the gas seal 20 and/or the further gas seal may have been marked. Preferably, the marking may have been implemented by a visible color dot or by a specific tactile property.

LIST OF REFERENCE SIGNS 2 device
4 encapsulation
6 insulation space
8 current-conducting component, voltage-conducting component
10 insulation medium, insulation gas
12 insulator
13 clamping pin
14 metal ring
16 bead
18; 181 further space; environment; air
20 gas seal

The invention claimed is:

1. A device for generation, transmission, distribution and/or use of electrical energy or a component of such a device, wherein, in at least one insulation space formed within the device, there is disposed a current-conducting component, and said insulation space comprises a dielectric insulation medium that surrounds the current-conducting component, wherein the insulation medium comprises
(a) at least one organofluorine compound selected from the group consisting of fluoroketones, fluoronitriles, and mixtures thereof and
(b) a carrier gas comprising at least one component selected from the group consisting of air, an air component, $CO_2$, or a mixture of these components, and the device comprises at least one gas seal for sealing of the at least one insulation space from a further space, wherein the gas seal comprises butyl rubber as seal material.

2. The device or component as claimed in claim 1, wherein the gas seal consists of butyl rubber as seal material.

3. The device or component as claimed in claim 1, wherein the gas seal comprises or consists of unmodified butyl rubber as seal material, or in that the gas seal comprises or consists of modified butyl rubber, especially chlorobutyl rubber (CIIR) or bromobutyl rubber (BIIR), as seal material.

4. The device or component as claimed in claim 1, wherein only part of the gas seal comprises or consists of butyl rubber, especially in that the gas seal has a butyl rubber coating or has been ensheathed with butyl rubber or has been in-mold-coated with butyl rubber.

5. The device or component as claimed in claim 1, wherein the at least one gas seal comprises butyl rubber, and further comprising at least one further gas seal made of another material wherein the gas seal and/or the further gas seal have been marked by a visible color dot or a specific tactile property.

6. The device or component as claimed in claim 1, wherein the butyl rubber has an isoprene content in the range from 1 mol % to 3 mol %.

7. The device or component as claimed in claim 1, wherein the gas seal is in the shape of a closed ring and/or in that the gas seal has an O-shaped or X-shaped or rectangle-shaped or double-O-shaped cross section.

8. The device or component as claimed in claim 1, wherein the fluoroketone is a perfluoroketone and is selected from the group consisting of: the fluoroketones having exactly 5 carbon atoms, the fluoroketones having exactly 6 carbon atoms, the fluoroketones having exactly 7 carbon atoms, and mixtures thereof.

9. The device or component as claimed in claim 1, wherein the fluoroketone comprises or is a perfluoroketone having the empirical formula $C_5F_{10}O$.

10. The device or component as claimed in claim 1, wherein the fluoronitrile is a perfluoronitrile having four carbon atoms.

11. The device or component as claimed in claim 1, wherein the fluoronitrile is perfluoroisobutyronitrile of the formula $(CF_3)_2CFCN$ and/or perfluoro-2-methoxypropanenitrile of the formula $CF_3CF(OCF_3)CN$.

12. The device or component as claimed in claim 1, wherein the medium present in the further space differs from the insulation medium in the insulation space.

13. The device or component as claimed in claim 1, wherein the device is
a switchgear unit, especially a gas-insulated, metal-encapsulated switchgear unit,
a switch, especially a grounding switch, an isolating switch, a circuit breaker and/or a power switch,
a high-voltage power switch having a heating chamber for provision of a self-blast effect,
a transformer, especially a distribution transformer or a power transformer,
an electrical rotating machine, a generator, a motor, a drive, a semiconductive component and/or a power electronics device, and/or
a converter station.

14. The device or component as claimed in claim 13, wherein the gas seal consists of butyl rubber as seal material.

15. The device or component as claimed in claim 13, wherein the gas seal comprises or consists of unmodified butyl rubber as seal material, or in that the gas seal comprises or consists of modified butyl rubber, especially chlorobutyl rubber (CIIR) or bromobutyl rubber (BIIR), as seal material.

16. The device or component as claimed in claim 13, wherein only part of the gas seal comprises or consists of butyl rubber, especially in that the gas seal has a butyl rubber coating or has been ensheathed with butyl rubber or has been in-mold-coated with butyl rubber.

17. The device or component as claimed in claim 1, wherein the butyl rubber has an isoprene content in the range from 1.5 mol % to 2.5 mol %.

18. The device or component as claimed in claim 1, wherein the fluoroketone is a perfluoroketone and the fluoroketone has 5 or 6 carbon atoms.

19. The device or component as claimed in claim 1, wherein the fluoroketone has the molecular formula $CF_3C(O)CF(CF_3)_2$.

20. The device or component as claimed in claim 1, wherein the fluoronitrile is perfluorobutyro-nitrile $(C_3F_7CN)$.

* * * * *